(12) United States Patent
Okabe (10) Patent No.: US 12,460,387 B2
(45) Date of Patent: Nov. 4, 2025

(54) WORK MACHINE (71) Applicant: KOMATSU LTD., Tokyo (JP)

(72) Inventor: Kazuyoshi Okabe, Tokyo (JP)

(73) Assignee: KOMATSU LTD., Tokyo (JP)

( * ) Notice: Subject to any disclaimer, the term of this patent is extended or adjusted under 35 U.S.C. 154(b) by 379 days.

(21) Appl. No.: 18/004,406

(22) PCT Filed: Jul. 19, 2021

(86) PCT No.: PCT/JP2021/027032
§ 371 (c)(1),
(2) Date: Jan. 5, 2023

(87) PCT Pub. No.: WO2022/070562
PCT Pub. Date: Apr. 7, 2022

(65) Prior Publication Data
US 2023/0295900 A1    Sep. 21, 2023

(30) Foreign Application Priority Data

Sep. 30, 2020    (JP) .................................. 2020-165734

(51) Int. Cl.
*E02F 9/26*       (2006.01)
*E02F 3/28*       (2006.01)
(Continued)

(52) U.S. Cl.
CPC ............... *E02F 9/26* (2013.01); *E02F 3/283* (2013.01); *E02F 9/0841* (2013.01);
(Continued)

(58) Field of Classification Search
None
See application file for complete search history.

(56) References Cited

U.S. PATENT DOCUMENTS 10,668,854 B2    6/2020    Imaizumi et al.
2017/0284060 A1    10/2017    Yamazaki et al.
(Continued)

FOREIGN PATENT DOCUMENTS

CN    106661864 A    5/2017
JP    3219005 U    10/2018
(Continued)

OTHER PUBLICATIONS

The International Search Report for the corresponding international application No. PCT/JP2021/027032, issued on Oct. 5, 2021.
(Continued)

*Primary Examiner* — Michael S Lowe
(74) *Attorney, Agent, or Firm* — GLOBAL IP COUNSELORS, LLP (57) ABSTRACT

A work machine includes a vehicle body, and a plurality of radar devices. The vehicle body includes a front frame and a rear frame, traveling wheels disposed on the front frame, and traveling wheels disposed the rear frame. The rear frame is relatively operably connected to the front frame by an articulated mechanism. The plurality of radar devices are positioned on right and left sides of a central axis that extends along a front-rear direction of the rear frame. The plurality of radar devices are installed at a rear part of the vehicle body. Each radar device of the plurality of radar devices includes a detector configured to detect an object, and the detector is installed facing outward from a direction parallel to the central axis.

7 Claims, 10 Drawing Sheets

(51) Int. Cl.
  *E02F 9/08*    (2006.01)
  *E02F 9/24*    (2006.01)
  *G01S 7/02*    (2006.01)
  *G01S 13/931*  (2020.01)
  *E02F 9/18*    (2006.01)

(52) U.S. Cl.
  CPC .............. *E02F 9/0866* (2013.01); *E02F 9/24* (2013.01); *G01S 7/028* (2021.05); *G01S 13/931* (2013.01); *E02F 9/0891* (2013.01); *E02F 9/18* (2013.01); *G01S 2013/93271* (2020.01)

(56) References Cited

U.S. PATENT DOCUMENTS

2018/0370432 A1* 12/2018 Imaizumi ................. E02F 3/34
2019/0093311 A1   3/2019  Naito

FOREIGN PATENT DOCUMENTS

| JP | 2019-31823 A    | 2/2019 |
| JP | 2019-163669 A   | 9/2019 |
| WO | 2018/043104 A1  | 3/2018 |
| WO | 2018/146782 A1  | 8/2018 |

OTHER PUBLICATIONS

The Office Action for the corresponding Chinese application No. 202180043205.6, issued on Dec. 12, 2024.

\* cited by examiner

WORK MACHINE

CROSS-REFERENCE TO RELATED APPLICATIONS

This application is a U.S. National stage application of International Application No. PCT/JP2021/027032, filed on Jul. 19, 2021. This U.S. National stage application claims priority under 35 U.S.C. § 119(a) to Japanese Patent Application No. 2020-165734, filed in Japan on Sep. 30, 2020, the entire contents of which are hereby incorporated herein by reference.

BACKGROUND

Technical Field

The present invention relates to a work machine.

Background Information

Collision suppression system has been proposed for detecting an obstacle to the rear and suppressing a collision in a work machine such as a wheel loader (for example, see Registration of Utility Model No. 3219005).

In such a collision suppression system, a radar device or the like fixed to the rear end of the work machine detects an obstacle existing in the rear of the engine room that is difficult to see from the cab.

SUMMARY

The above-mentioned fixed radar device has a limited detection range, while a vehicle having an articulated mechanism such as a wheel loader has a small turning radius, so, it is necessary to widen the detection range when turning. Therefore it was difficult to detect an obstacle appropriately.

An object of the present disclosure is to provide a work machine capable of detecting an obstacle more appropriately.

A work machine according to a disclosure comprise a vehicle body and a plurality of radar devices. The vehicle body includes a front frame and a rear frame. Traveling wheels are disposed on the front frame. Traveling wheels are disposed on the rear frame. The rear frame is relatively operably connected to the front frame with an articulated mechanism. The plurality of radar devices are positioned on a right side and a left side of a central axis along a front-rear direction of the rear frame and installed at a rear part of the vehicle body. Each radar device of the plurality of radar devices includes a detector configured to detect an object. The detector is disposed facing outward from a direction parallel to the central axis.

According to the present disclosure, it is possible to provide a work machine capable of detecting an obstacle more appropriately.

DETAILED DESCRIPTION OF EMBODIMENT(S)

A wheel loader as an example of a work machine according to the present disclosure will be described below with reference to the drawings.

Outline of Wheel Loader

Figure 1:
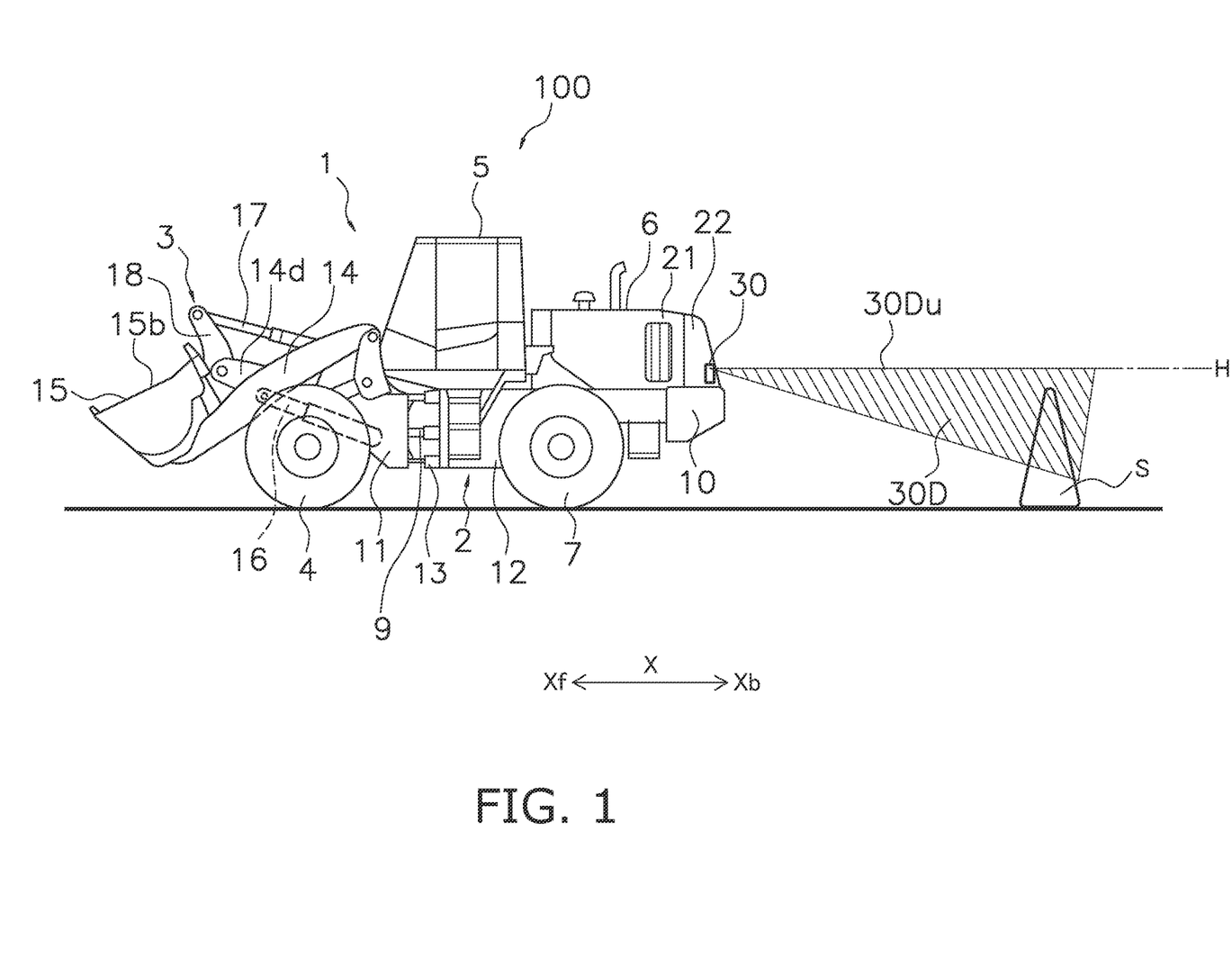
FIG. 1 is a side illustrating a wheel loader of an embodiment according to the present disclosure.

FIG. 1 is a side view illustrating the wheel loader 100 (an example of a work machine) of present embodiment.

A wheel loader 100 of present embodiment includes a vehicle body 1 and a plurality of radar devices 30. The vehicle body 1 includes an articulated mechanism. A plurality of radar devices 30 are disposed on the rear part of the vehicle body 1.

A vehicle body 1 includes a vehicle body frame 2, a work implement 3, a pair of front tires 4 (an example of traveling wheels), a cab 5, an engine room 6, a pair of rear tires 7 (an example of traveling wheels), and a steering cylinder 9, and a counterweight 10.

In the following description, "front", "rear", "right", "left", "up", and "down" indicate directions relative to a state of looking forward from the driver's seat. Also, "vehicle width direction" and "left-right direction" have the same meaning. In FIG. 1, the front-rear direction is indicated by X, the front direction is indicated by Xf, and the rear direction is indicated by Xb.

The wheel loader 100 performs work such as earth and sand loading by using the work implement 3.

The vehicle body frame 2 is a so-called articulated construction and includes a front frame 11, a rear frame 12, and a coupling shaft part 13. The front frame 11 is disposed in front of the rear frame 12. The coupling shaft part 13 is provided in the center in the vehicle width direction and couples the front frame 11 and the rear frame 12 to each other in a manner that allows swinging. The pair of front tires 4 are attached to the left and right of the front frame 11. The pair of rear tires 7 are attached to the left and right of the rear frame 12.

The work implement 3 is driven by hydraulic fluid from a work implement pump (not shown). The work implement 3 is attached to the front part of the front frame 11 in a manner that allows swinging. The work implement 3 includes a boom 14, a bucket 15, a lift cylinder 16, a bucket cylinder 17, and a bell crank 18.

The base end of the boom 14 is rotatably attached to a front part of the front frame 11. The tip end of the boom 14 is rotatably attached to a rear part of the bucket 15. The rear part of the bucket 15 is on the opposite side from an opening 15*b*. The tip end of a cylinder rod of the lift cylinder 16 is rotatably attached between the base end and the tip end of the boom 14. The cylinder body of the lift cylinder 16 is rotatably attached to the front frame 11.

One end part of the bell crank 18 is rotatably attached to the tip end of a cylinder rod of the bucket cylinder 17. The other end part of the bell crank 18 is rotatably attached to a rear part of the bucket 15. The bell crank 18 is rotatably supported by a bell crank support 14d near the middle of the boom 14 between either end. The cylinder body of the bucket cylinder 17 is rotatably attached to the front frame 11. The extension/contraction force of the bucket cylinder 17 is converted to rotational movement by the bell crank 18 and is transmitted to the bucket 15.

The bucket 15 is rotatably attached to the tip end of the boom 14 so as to open toward the front. By extending and contracting the bucket cylinder 17, the bucket 15 rotates with respect to the boom 14 and performs a tilting motion and a dumping motion.

The cab 5 is disposed on the rear frame 12. A steering handle for performing steering operations, a lever for operating the work implement 3, and various display devices are disposed inside the cab 5. The engine room 6 is disposed to the rear of the cab 5 and on the rear frame 12 and accommodates an engine (not shown).

Figure 2A:
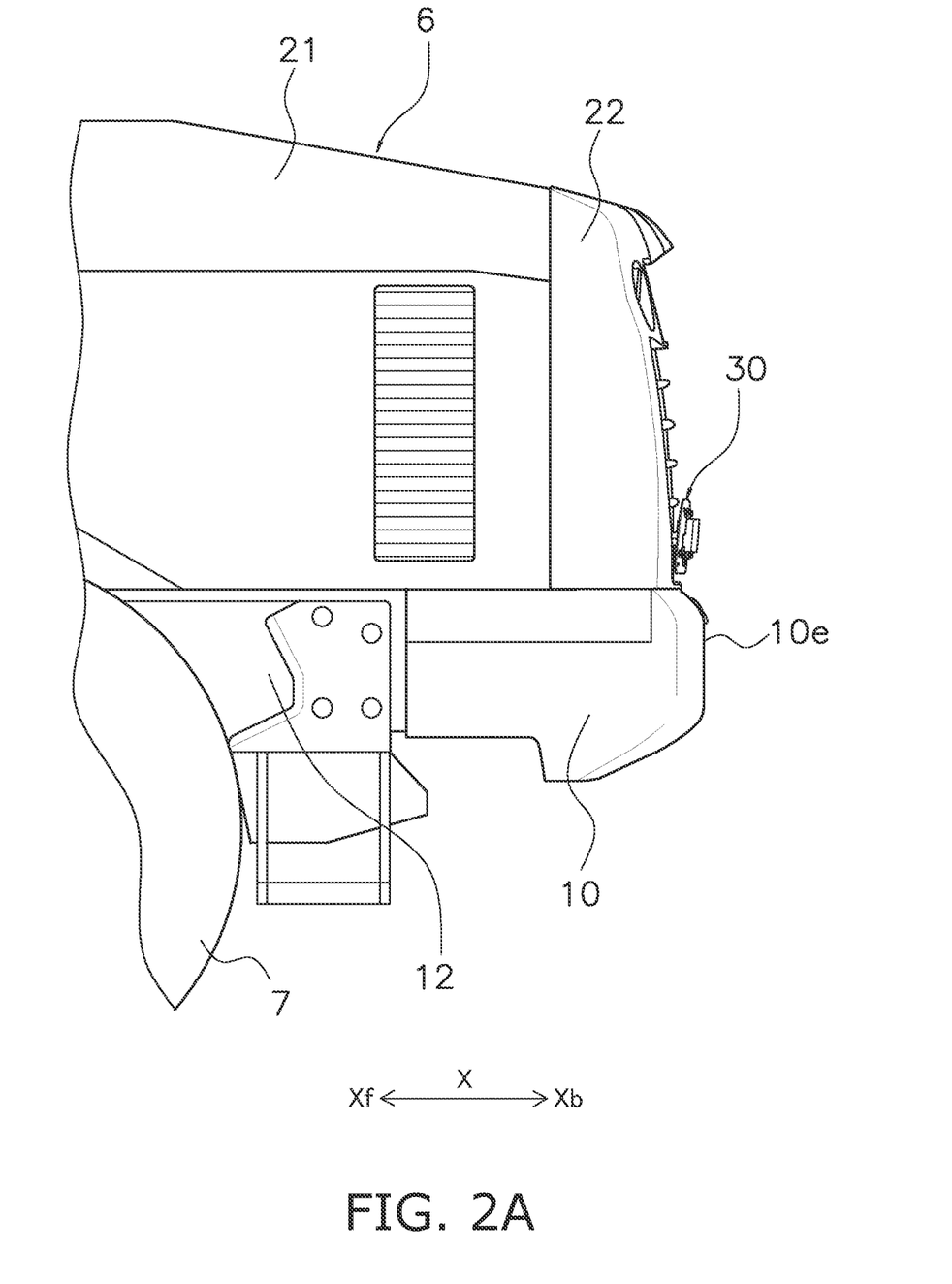
FIG. 2A is a rear view of the wheel loader of FIG. 1.
Figure 2B:
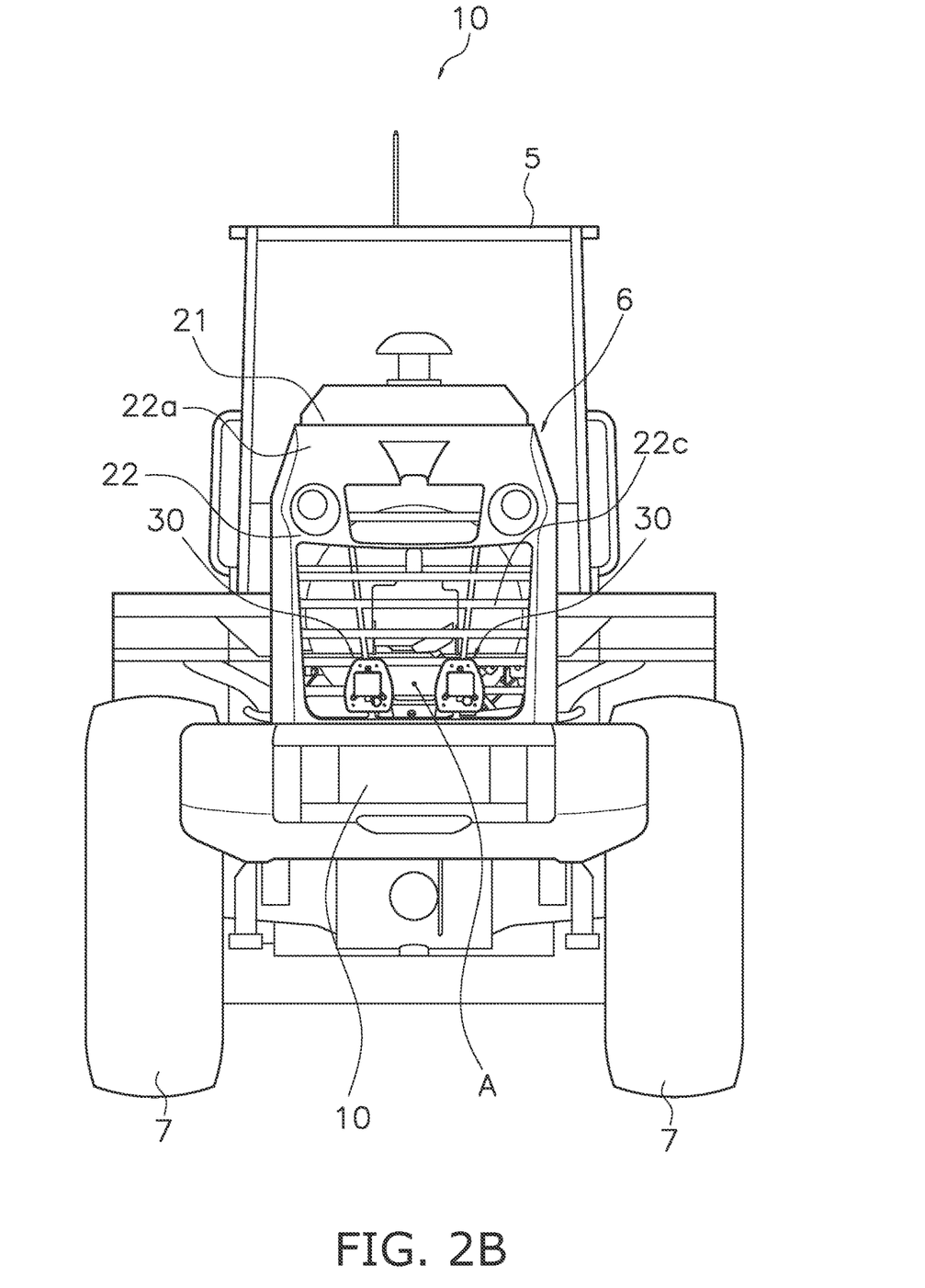
FIG. 2B is a side view illustrating a rear part of the wheel loader in FIG. 1.
Figure 2C:
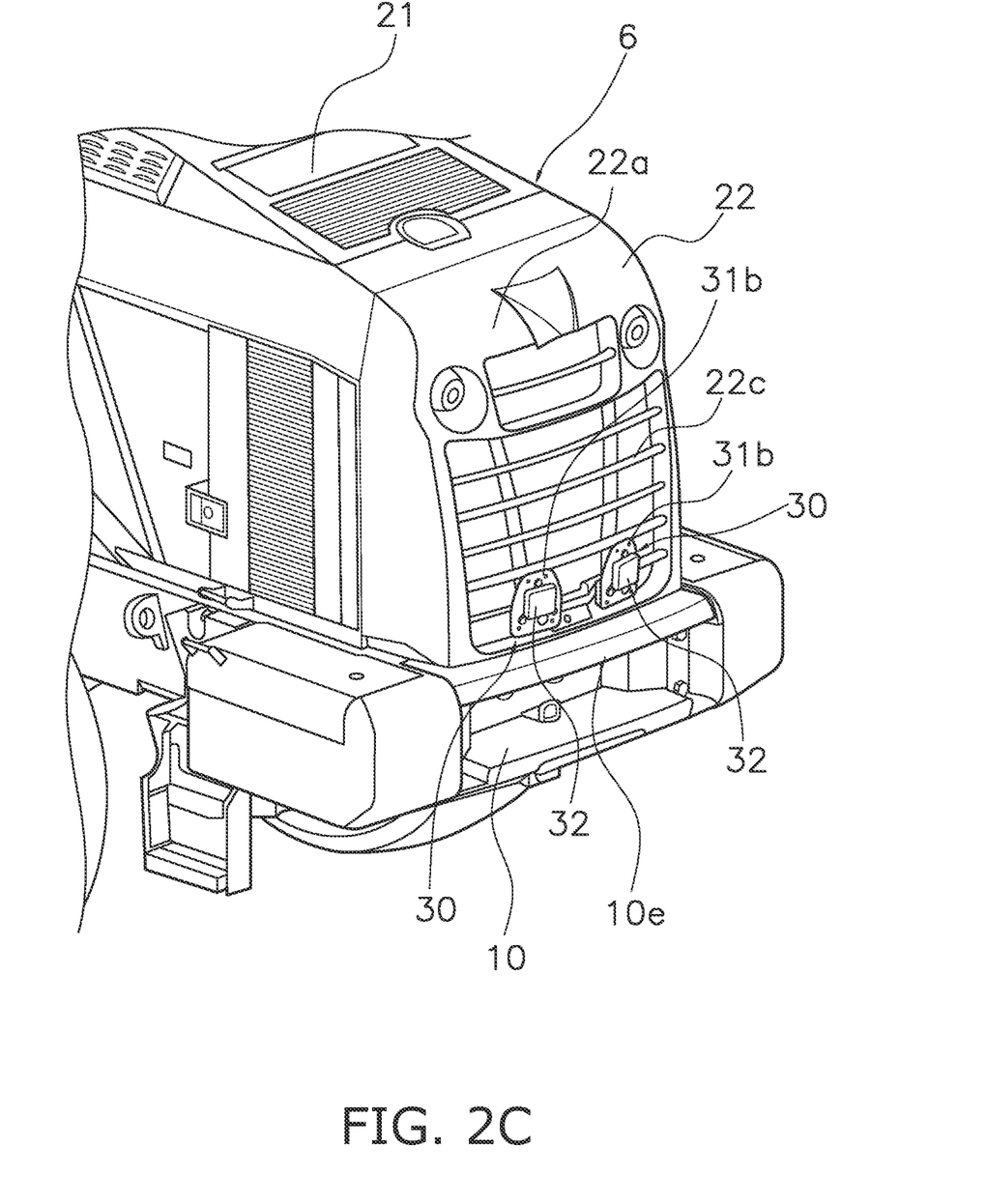
FIG. 2C is a perspective view illustrating the rear part of the wheel loader in FIG. 1.

FIG. 2A is a side view illustrating the rear part. FIG. 2B is a rear view of wheel loader 100. FIG. 2C is a perspective view illustrating the rear part of wheel loader 100.

The counterweight 10 is attached to the rear part of the rear frame 12. The counterweight 10 is disposed so as to protrude rearward from below the engine room 6. A part of the counterweight 10 is located in the rear of the engine room 6. A rear end 10e which is an end of the counterweight 10 on the rear direction Xb side corresponds to the rear end of the wheel loader 100.

The rear frame 12 is configured by combining frame members, the cab 5 is disposed above the front part of the rear frame 12, and the engine room 6 is disposed above the rear frame 12 in the rear of the cab 5. As shown in FIG. 2A, the counterweight 10 is attached to the rear part of the rear frame 12 and is disposed below the rear part of the engine room 6, and the rear end 10e of the counterweight 10 protrudes rearward beyond the engine room 6.

(Engine Room 6)

Figure 3:
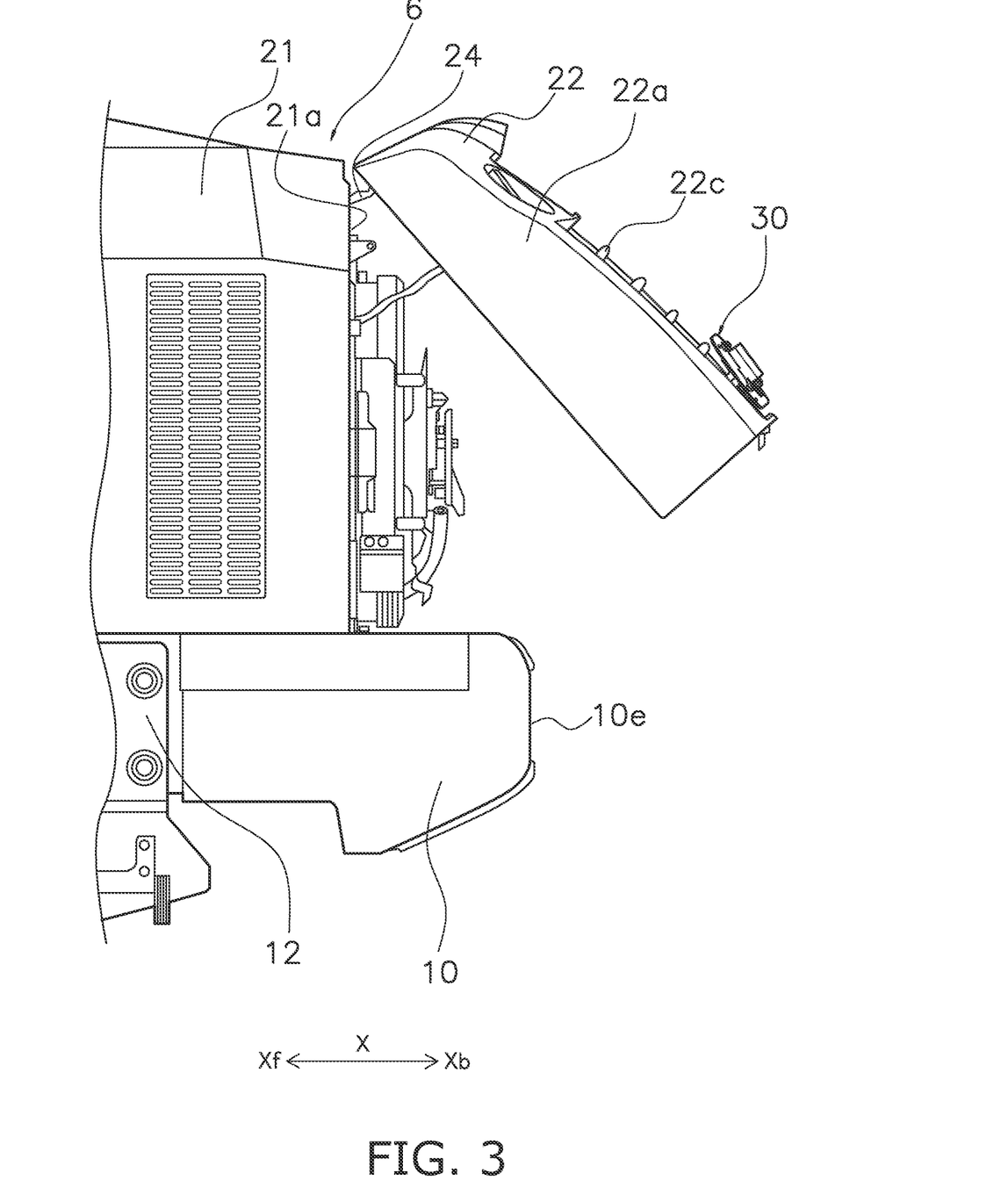
FIG. 3 is a side view illustrating a state in which a grille is rotated upward with respect to the main body in FIG. 2A.

As shown in FIGS. 2A to 2C, the engine room 6 includes a main body part 21 and a grille 22 that is rotatable with respect to the main body part 21. FIG. 3 is a side view illustrating a state in which the grille 22 is rotated upward with respect to the main body part 21.

The main body part 21 is provided so as to form side plates that covers the front and left and right sides of the engine disposed on the rear frame 12 and a top plate that covers the top of the engine. As shown in FIG. 3, the rear end of the main body part 21 is provided with an opening 21a. The grille 22 is disposed so as to block the opening 21a at the rear end of the main body part 21. The grille 22 includes a grid-like part 22c on its rear surface, and as shown in FIGS. 2A and 2C, air for cooling the cooling water of the engine is discharged from the engine room 6 through the grille 22 to the outside.

As shown in FIG. 3, a hinge 24 is disposed between the top part of the rear end of the main body part 21 and the top part of the grille 22. The hinge 24 allows the grille 22 to rotate in the up-down direction around the upper part of the rear end of the main body part 21. By rotating the grille 22 upward, the fan and the like inside the engine room 6 can be cleaned.

Figure 4:
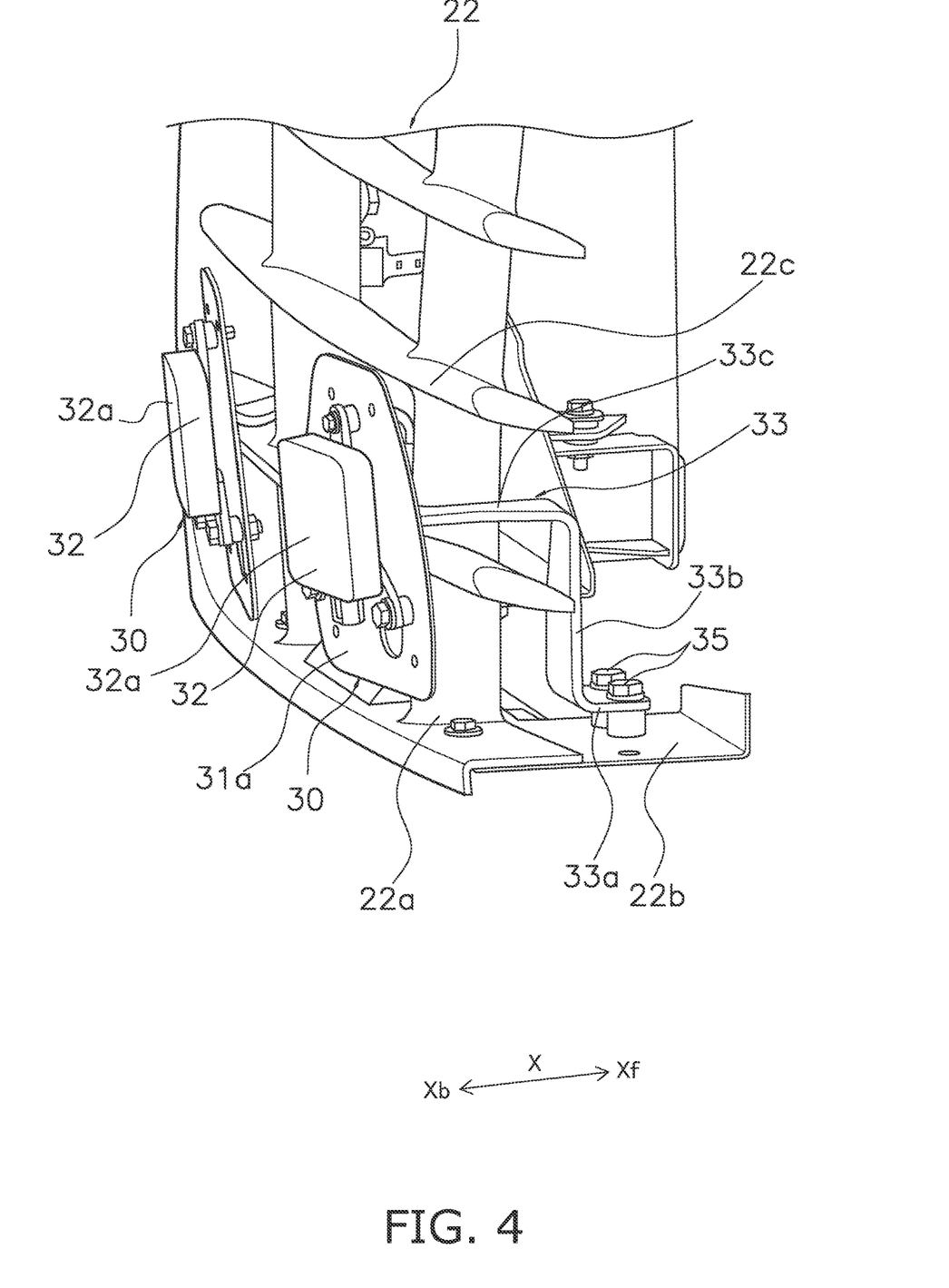
FIG. 4 is a perspective cross-sectional view of the vicinity of radar devices in FIG. 2C.

FIG. 4 is a partially enlarged view of the grille 22. Grille 22 includes a panel part 22a and a structural member 22b.

The panel part 22a is made of resin and forms the outer surface, and the panel part 22a also includes a grid-like part 22c provided on the rear surface thereof. Structural member 22b is made of metal and is provided to support the panel part 22a. Although not shown, the structural member 22b is provided in a frame shape around the grid-like part 22c, and the hinge 24 described above is provided on the structural member 22b.

As shown in FIG. 2A, the position of the grille 22 is located on the front direction Xf side than the rear end 10e of the counterweight 10. The radar devices 30 are disposed between the grille 22 and the rear end 10e in the front-rear direction X with a gap from each of the grille 22 and the counterweight 10.

(Radar Device 30)

The radar device 30 detects the presence of an obstacle S in the rear of the vehicle body 1, as shown in FIG. 1. As shown in FIG. 2C, the wheel loader 100 of this embodiment is provided with two radar devices 30. The radar devices 30 are disposed above the counterweight 10. As shown in FIG. 2A, the radar devices 30 are disposed on the lower part of the grille 22 and on the rear direction Xb side of the grille 22.

Figure 5:
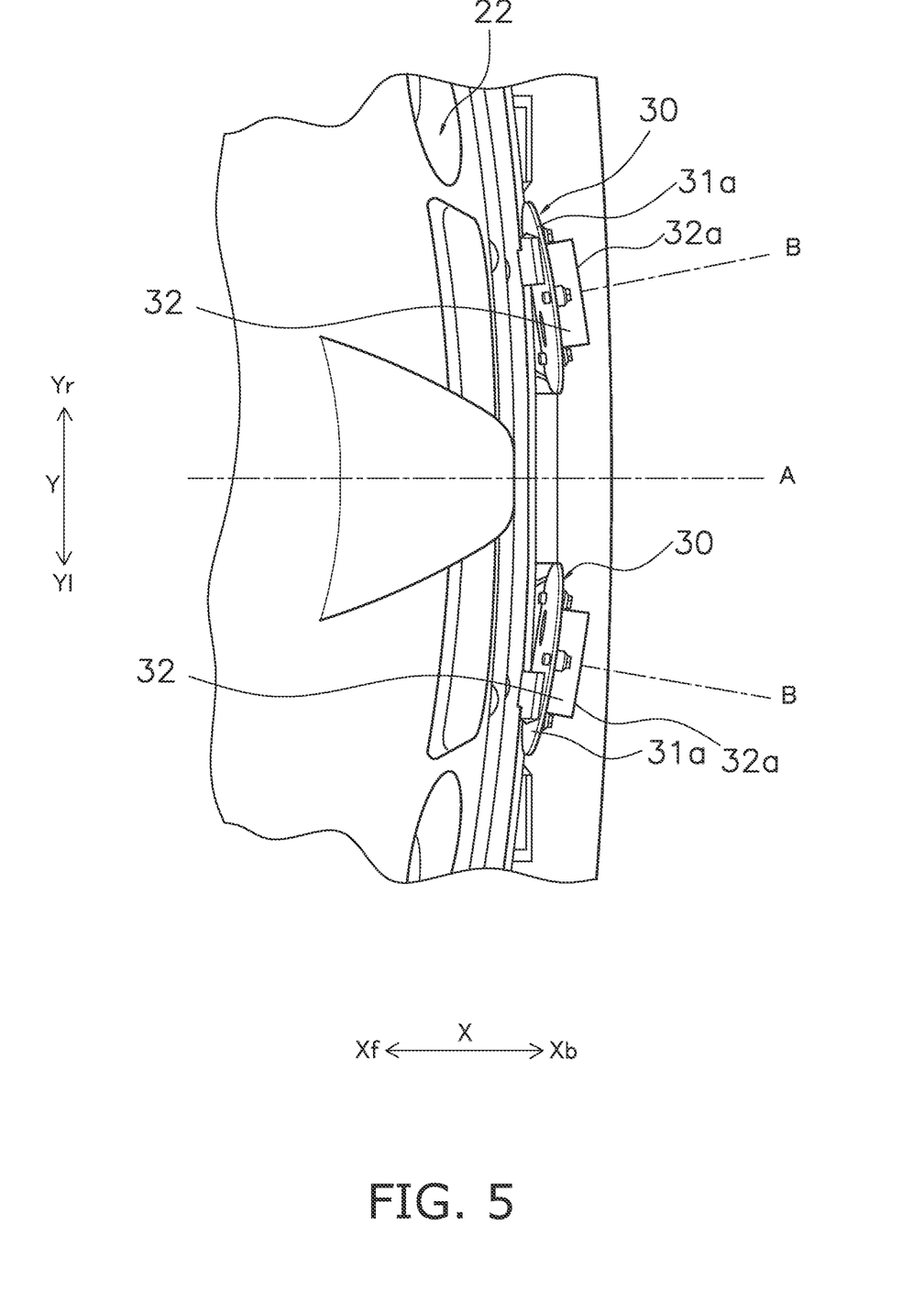
FIG. 5 is a plan view illustrating the radar devices in FIG. 4 as viewed from the top.

FIG. 5 is a plan view illustrating the vicinity of two radar devices 30. As shown in FIG. 5, the two radar devices 30 are disposed on the right side and the left side of the central axis A along the front-rear direction of the rear frame 12. In FIG. 5, the left-right direction is indicated by an arrow Y, the left direction of the left-right direction Y is indicated by an arrow Yl, and the right direction is indicated by an arrow Yr. As shown in FIGS. 2A and 5, in this embodiment, the plurality of radar devices 30 are disposed symmetrically with respect to the central axis A.

The radar device 30 is, for example, a millimeter wave radar. The radar device 30 can measure the distance to an object by detecting, with the receiving antenna, the radio waves in the millimeter wave band which is emitted from the transmitting antenna and is returned after being reflected by the surface of the obstacle. A detection result by the radar device 30 is transmitted to a processor (not shown), and the processor can detect that an obstacle exists within a predetermined range when the wheel loader 100 is moving rearward. The transmitting antenna emits radio waves at a wider angle in the left-right direction than in the up-down direction.

Figure 6A:
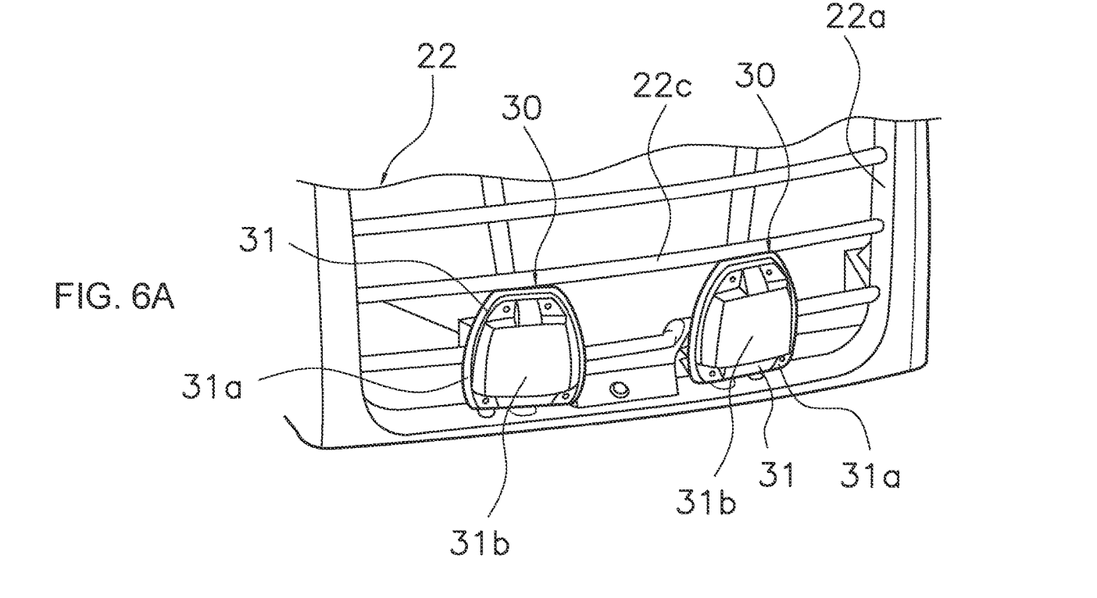
FIG. 6A is a perspective view of the radar devices in FIG. 4 as viewed from the rear.
Figure 6B:
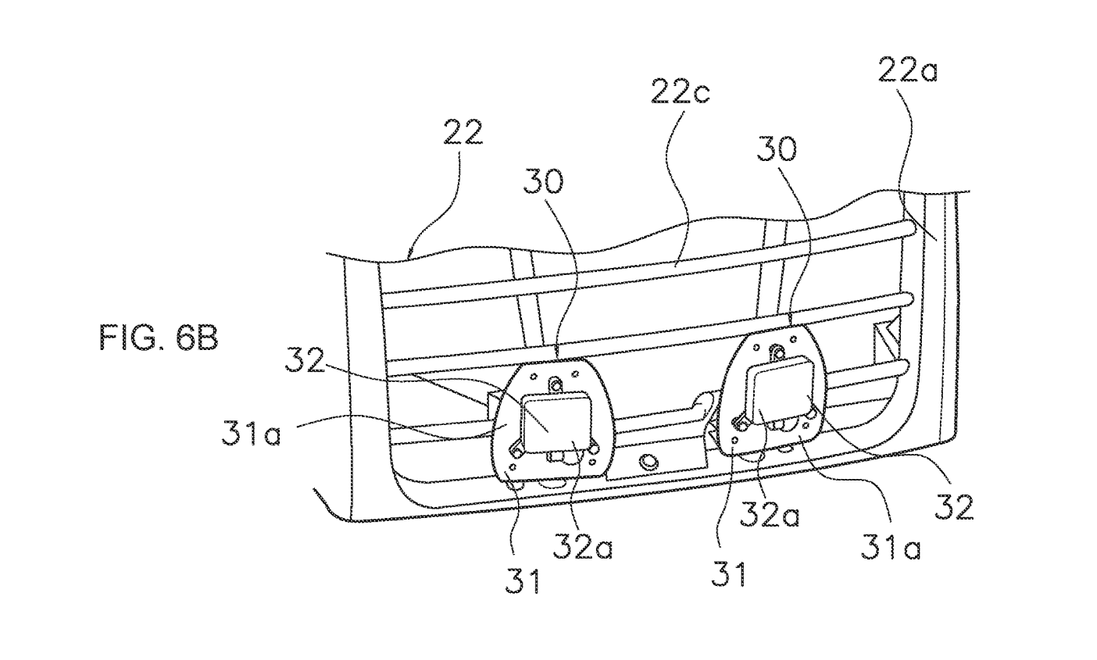
FIG. 6B is a perspective view illustrating a state in which detectors are exposed from the radar devices in FIG. 6A.

FIG. 6A is a perspective view of the vicinity of the radar device 30 as view from the rear. FIG. 6B is a view illustrating a state in which the cover part 31b is removed from the configuration shown in FIG. 6A. The radar device 30 includes a housing 31 and a detector 32. Housing 31 houses detector 32. The housing 31 includes a support part 31a that supports the detector 32 and a cover part 31b that covers the surface of the detector 32. As shown in FIG. 6B, the detector 32 is fixed to the surface of the support part 31a of the housing 31. Detector 32 is provided with a transmitting antenna and a receiving antenna. The detector 32 is attached to the support part 31a so that the detection surface 32a faces rearward. Note that the radar device 30 shown in FIGS. 2 to 5 described above is in a state in which the cover part 31b is removed. The cover part 31b is attached to the support part 31a so as to cover the detection surface 32a from the rear.

Radar device 30 is fixed to grille 22. Therefore, as shown in FIG. 3, when the grille 22 rotates upward with respect to the main body part 21, the radar device 30 also moves upward together with the grille 22.

As shown in FIG. 4, the radar device 30 is fixed to the grille 22 with a bracket 33.

The bracket 33 is fixed to a structural member 22b, which is made of metal, of grille 22. For example, the bracket 33 is fixed to the structural member 22b on the front side of the grid-like part 22c of the grille 22 (which can be said to be the inside of the engine room 6), and passes through the gap of the grid-like part 22c and supports the radar device 30 on the rear side of the grid-like part 22c.

For example, the bracket 33 is formed by bending one elongated plate member. The bracket 33 includes a first portion 33a, a second portion 33b, and a third portion 33c.

The first portion 33a is fixed to the horizontal portion of the structural member 22b by bolts 35 on the front direction Xf side of the grid-like part 22c of the grille 22. The second portion 33b is formed upward from the rear end of the first portion 33a. The third portion 33c extends from the upper end of the second portion 33b to the rear direction Xb side through the gaps of the grid-like part 22c and is attached to the support part 31a on the rear side of the grille 22.

Each detector 32 provided in the two radar devices 30 is installed so as to face outward from the direction parallel to the central axis A of the rear frame 12, as shown in FIG. 5.

The detector 32 of the radar device 30 disposed on the left direction Yl side of the central axis A is inclined with respect to the front-rear direction X so that the detection surface 32a faces the left direction Yl side of the vehicle body 1. The detector 32 of the radar device 30 disposed on the right direction Yr side of the central axis A is inclined with respect to the front-rear direction X so that the detection surface 32a faces the right direction Yr side of the vehicle body 1.

Specifically, the detector 32 of the radar device 30 disposed on the left direction Y1 side of the central axis A is disposed so that a vertical line B, which is perpendicular to the detection surface 32a and extending in the rear direction from the detection surface 32a, tilts toward the left direction Yl side from the direction parallel to the central axis A as it goes in the rear direction. The detector 32 of the radar device 30 disposed on the right direction Yr side of the central axis A is disposed so that a vertical line B, which is perpendicular to the detection surface 32a and extending in the rear direction from the detection surface 32a, tilts toward the right direction Yr side from the direction parallel to the central axis A as it goes in the rear direction.

In this way, each of the plurality of detectors 32 is disposed such that the vertical line B, which is perpendicular to the detection surface 32a and extending in the rear direction from the detection surface 32a, tilts toward the outside of the vehicle body 1 from the direction parallel to the central axis A as it goes in the rear direction. This make it possible to widen the detection range in the width direction (left-right direction) at the rear of the vehicle body 1

Figure 7:
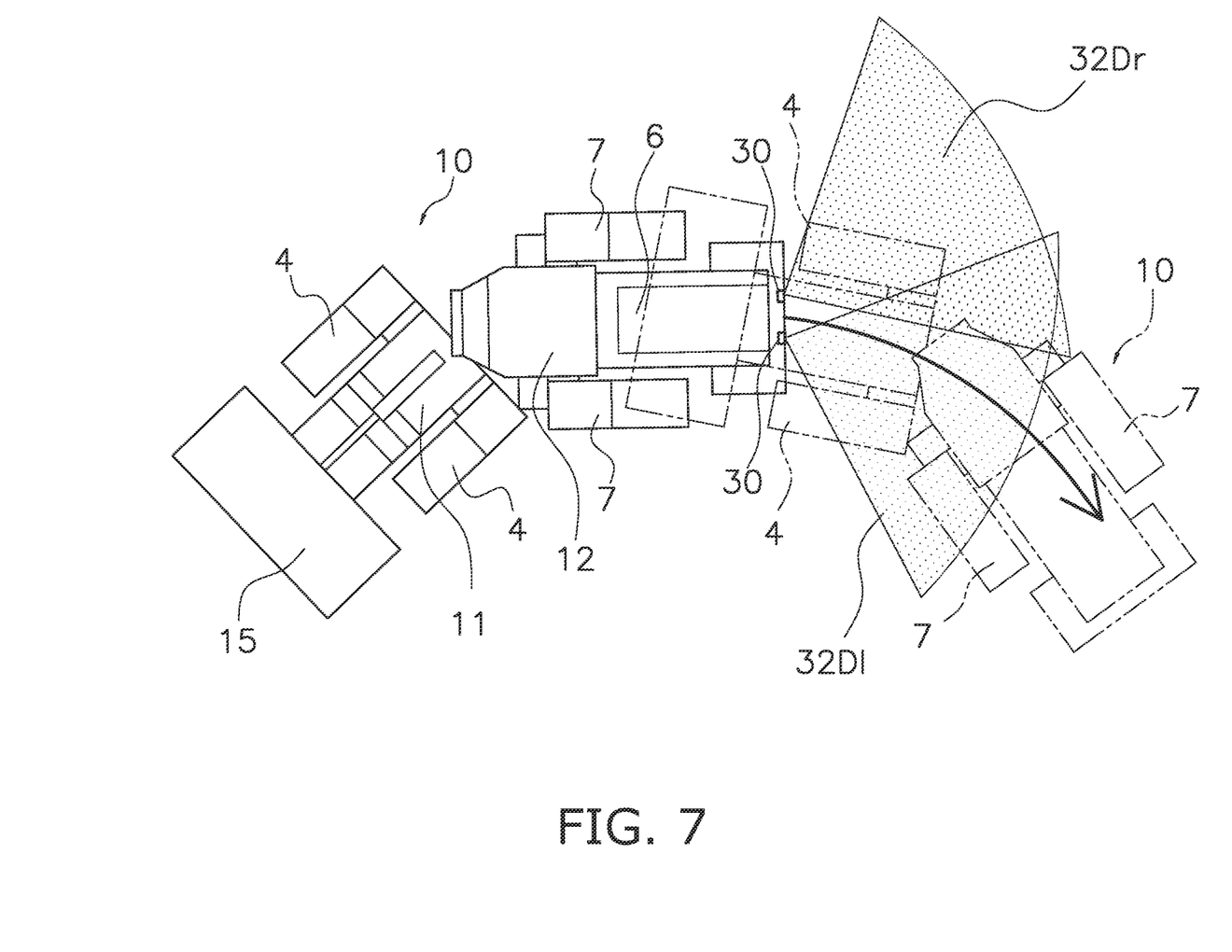
FIG. 7 is a plan view illustrating a state in which the wheel loader in FIG. 1 is bend.

FIG. 7 is a view illustrating a state in which the wheel loader 100 is traveling in the rear direction while bending. In FIG. 7, the wheel loader 100 that has traveled in the rear direction is indicated by a two-dot chain line.

In FIG. 7, the detection range of the radar device 30 in the left side is indicated by 30Dl, and the detection range of the radar device 30 in the right side is indicated by 30Dr. In addition, when it is not necessary to distinguish the detection range between the left side and right side radar devices 30, the detection range is indicated as 30D.

By disposing each radar device 30 so that the detector 32 faces outward as described above, an obstacle in a wide range in the left-right direction can be detected when the vehicle travels in the rear direction while bending.

In addition, as shown in FIG. 5, the inclination angle of the radar device 30 is set so as not to protrude in the rear direction from the rear end 10e of the counterweight 10.

Figure 8:
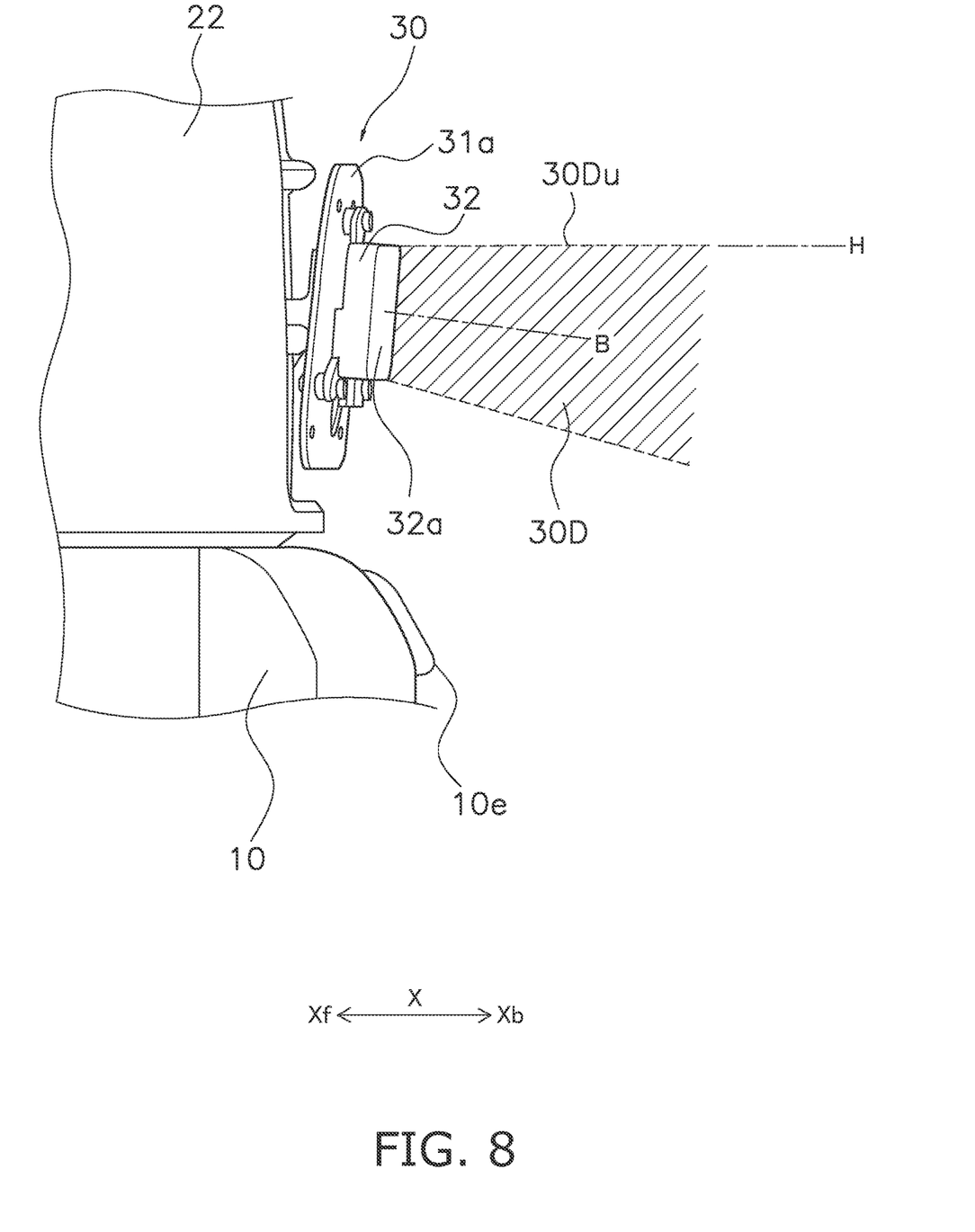
FIG. 8 is an enlarged view illustrating the vicinity of the radar devices in FIG. 2A.

FIG. 8 is a side view illustrating the vicinity of the radar device 30. As shown in FIG. 8, the radar device 30 is disposed in the front side of the rear end 10e of the counterweight 10. Although the cover part 31b is not provided in FIG. 8, even when the cover part 31b is combined with the support part 31a, the radar device 30 is disposed in the front side of the rear end 10e of the counterweight 10.

The radar device 30 is disposed between the rear end 10e of the counterweight 10 and the grille 22 in the front-rear direction X. The radar device 30 is disposed with an outward inclination so as not to protrude in the rear direction from the counterweight 10.

The radar device 30 is disposed so that the detection surface 32a of the detector 32 faces downward from the horizontal axis H. More specifically, as shown in FIG. 8, the detectors 32 are disposed so that a vertical line B, which extends in the rear direction from the detection surface 32a of the detector 32 of each of the left and right radar devices 30 and is perpendicular to the detection surface 32a, faces downward from the horizontal axis H.

Further, as shown in FIG. 1, the radar device 30 is installed so that the upper end 30Du of the up-down range in the detection range 30D of the detector 32 of the radar device 30 is parallel to the horizontal axis H.

In order to detect an obstacle, it is necessary that the obstacle occupies a certain range in the detection range in the up-down direction of the radar device. As shown in FIG. 1, by installing the radar devices 30, an obstacle can be detected appropriately while ensuring a detectable distance from the rear end of the vehicle body 1.

(Features)

(1)

A wheel loader 100 (an example of a work machine) of the present embodiment includes a vehicle body 1 and a plurality of radar devices 30. The vehicle body 1 includes a front frame 11 and a rear frame 12. Front tires 4 (an example of traveling wheels) are disposed on the front frame 11. Rear tires 7 (an example of traveling wheels) are disposed on the rear frame 12. The rear frame 12 is relatively operably connected to the front frame 11 by an articulated mechanism. The plurality of radar devices 30 are positioned on right and left sides of the central axis A along the front-rear direction of the rear frame 12 and installed in the rear part of the vehicle body 1. The radar device 30 includes a detector 32 that detects an obstacle S (an example of an object). The detector 32 is installed facing outward from the direction parallel to the central axis A.

By providing a plurality of radar devices 30 in this way, it is possible to widen the detection range in the left-right direction. Therefore, as shown in FIG. 7, it is possible to more properly detect an obstacle even when the vehicle travels in the rear direction while turning.

In addition, by installing the detector 32 toward the outside of the direction parallel to the central axis A, the left and right detection ranges behind the vehicle body 1 can be widened.

(2)

In the wheel loader 100 (an example of a work machine) of the present embodiment, the vehicle body 1 further includes a counterweight 10 disposed on the rear part of the rear frame 12. The radar devices 30 are installed in the front side of the rear end 10e of the counterweight 10.

As a result, the radar device 30 is prevented from protruding behind the counterweight 10, and the overall length can be suppressed.

(3)

In the wheel loader 100 (an example of a work machine) of the present embodiment, the detector 32 is installed below the horizontal axis H of the rear frame 12.

In detection by the radar device 30, it is necessary that the obstacle occupies a certain range in the detection range in the up-down direction of the radar device 30. Therefore, by installing the radar devices 30 as described above, an obstacle can be detected appropriately while ensuring a detectable distance from the rear end of the vehicle body 1.

(4)

In wheel loader 100 (an example of a work machine) of the present embodiment, the detector 32 is installed such that upper end 30Du of detection range 30D is along horizontal axis H.

As a result, the obstacle can be detected appropriately while ensuring a detectable distance from the rear end of the vehicle body 1.

(5)

In the wheel loader 100 (an example of a work machine) of the present embodiment, the vehicle body 1 further includes an engine room 6 and a counterweight 10. The engine room 6 is disposed in the rear frame 12 and accommodates the engine. The counterweight 10 is disposed at the rear part of the rear frame 12. The engine room 6 includes a main body part 21 and a grille 22. The main body part 21 includes an opening 21a at its rear end. The grille 22 is disposed above the counterweight 10 so as to block the opening 21a of the main body part 21. A part of the counterweight 10 is disposed in the rear of the engine room 6. The radar devices 30 are attached to the grille 22.

By attaching the radar devices 30 to the grille 22 in this manner, the radar devices 30 can be attached to the rear end of the vehicle body 1.

(6)

In wheel loader 100 (an example of a work machine) of the present embodiment, radar devices 30 are attached to a structural member 22b, which is made of metal, of grille 22.

Thereby, the radar devices 30 can be stably disposed on the grille 22. Further, even when the grille 22 is rotatable with respect to the main body part 21, the radar devices 30 can be stably disposed by attaching them to the structural member 22b.

(7)

In the wheel loader 100 (an example of a work machine) of the present embodiment, the radar device 30 further includes a housing 31 that houses the detector 32.

Thereby, the detector 32 can be protected.

(8)

In this embodiment, the work machine is the wheel loader 100. The wheel loader 100 includes a work implement 3 and a cab 5. The work implement 3 is disposed in front of the front frame 11. The cab 5 is disposed in front of the engine room 6.

As a result, in the wheel loader 100, the detection range in the left-right direction at the rear can be widened.

Other Embodiments

Although one embodiment of the present invention has been described above, the present invention is not limited to the above-described embodiment, and various modifications are possible without departing from the gist of the invention.

(A)

In the above embodiment, two radar devices 30 are provided, but three or more radar devices 30 may be provided in the width direction (left-right horizontal direction Y).

(B)

One or a plurality of radar devices 30 may be disposed above or below one radar device 30 provided on the left side of the central axis A. Further, one or a plurality of radar devices 30 may be arranged above or below one radar device 30 provided on the right side of the central axis A.

(C)

In the above-described embodiment, the plurality of radar devices 30 are disposed symmetrically with respect to the central axis A, but they may not be disposed symmetrically.

(D)

The radar devices 30 are fixed to the structural member 22b of the grille 22 in the above embodiment, but are not limited to this and may be attached to the counterweight 10, for example. When the radar devices 30 are attached to the counterweight 10, the radar devices 30 are not limited to being attached to the surface of the counterweight 10, and may be embedded.

(E)

In the above-described embodiment, the grille 22 is provided so as to be rotatable upward with respect to the main body part 21, but it may be provided so as to be rotatable not only upwardly, but also to the left or right, for example.

(F)

Although the radar devices 30 are fixed to the structural member 22b, which is made of metal, of the grille 22 in the above embodiment, the radar devices 30 may be attached to the grid-like part 22c when the grid-like part 22c is made of metal.

(G)

In the above embodiment, a wheel loader is used as an example of a work machine, but a dump truck, motor grader, or the like including an articulated mechanism may also be used.

INDUSTRIAL APPLICABILITY

According to the work machine of the present disclosure, it is possible to detect an obstacle more appropriately.

What is claimed is:

1. A work machine comprising:
   a vehicle body including a front frame and a rear frame, traveling wheels being disposed on the front frame, traveling wheels being disposed the rear frame, the rear frame being relatively operably connected to the front frame by an articulated mechanism; and
   a plurality of radar devices positioned on right and left sides of a central axis that extends along a front-rear direction of the rear frame, the plurality of radar devices being installed at a rear part of the vehicle body,
   each radar device of the plurality of radar devices including a detector configured to detect an object, and the detector being installed facing outward from a direction parallel to the central axis,
   the vehicle body further including
   an engine room disposed in the rear frame and housing an engine, and
   a counterweight disposed at a rear part of the rear frame, the engine room including,
a main body part including an opening at rear end thereof, and
a grille disposed above the counterweight so as to block the opening of the main body part,
a part of the counterweight being located behind the engine room,
the grille including
a panel part including a grid-like part provided on a rear surface of the panel part, and
a structural member supporting the panel part, the structural member being provided in a frame shape around the grid-like part, and
the plurality of radar devices being attached to the structural member of the grille so as to be disposed on a rear side of the grid-like part.

2. The work machine according to claim 1, wherein the radar devices are installed forward of a rear end of the counterweight.

3. The work machine according to claim 1, wherein the detectors are installed downward from a horizontal axis of the rear frame.

4. The work machine according to claim 3, wherein the detectors are installed such that an upper end of detection range is along the horizontal axis.

5. The work machine according to claim 1, wherein the structural member is made of metal.

6. The work machine according to claim 1, wherein each radar device further includes a housing that houses the detector.

7. The work machine according to claim 1, further comprising:
a work implement disposed in front of the front frame; and
a cab disposed in front of the engine room,
the work machine being a wheel loader.

* * * * *